(12) United States Patent
Migdal et al.

(10) Patent No.: US 11,639,590 B2
(45) Date of Patent: May 2, 2023

(54) METHODS AND WATER RESERVOIR SYSTEMS FOR GENERATING, ACCUMULATING, STORING, AND RELEASING ELECTRICAL ENERGY

(71) Applicants: Alexander Arkady Migdal, Princeton, NJ (US); Michael Pesin, Washington, DC (US); Dmitry Paperny, The Sea Ranch, CA (US)

(72) Inventors: Alexander Arkady Migdal, Princeton, NJ (US); Michael Pesin, Washington, DC (US); Dmitry Paperny, The Sea Ranch, CA (US)

( * ) Notice: Subject to any disclaimer, the term of this patent is extended or adjusted under 35 U.S.C. 154(b) by 0 days.

(21) Appl. No.: 17/942,021

(22) Filed: Sep. 9, 2022

(65) Prior Publication Data

US 2023/0002993 A1    Jan. 5, 2023

Related U.S. Application Data

(60) Provisional application No. 63/391,534, filed on Jul. 22, 2022, provisional application No. 63/327,498, (Continued)

(51) Int. Cl.
*E02B 9/08* (2006.01)
*F03B 13/06* (2006.01)
(Continued)

(52) U.S. Cl.
CPC ............. *E02B 9/08* (2013.01); *E02B 9/02* (2013.01); *F03B 13/06* (2013.01); *F03B 13/12* (2013.01)

(58) Field of Classification Search
CPC .... E02B 9/00; E02B 9/08; F03B 13/06; F03B 13/12
(Continued)

(56) References Cited

U.S. PATENT DOCUMENTS 3,993,913 A * 11/1976 Dickman ................. E02B 9/08
290/53
4,569,200 A * 2/1986 Lamb .................... F03B 13/268
405/76
(Continued)

FOREIGN PATENT DOCUMENTS

AU       2015326555 A1 *  3/2017  ............... E02B 7/02
CN       106223262 A    * 12/2016  ............... E02B 7/02
(Continued)

*Primary Examiner* — Frederick L Lagman
(74) *Attorney, Agent, or Firm* — Boris Leschinsky

(57) ABSTRACT

A water reservoir system for generating, accumulating, storing, and releasing electrical energy comprises a reservoir wall built in a shallow body of water such as a sea or an ocean with a height exceeding the outside water level by about 10-25 m, thereby defining an interior of the water reservoir. Excess electrical energy from other renewable sources of electricity such as wind, solar power, or supplied by a local power grid is used to operate water pumps to fill the interior of the water reservoir with water during times of peak supply of electricity. Water is drained from the water reservoir to the outside body of water and generates electrical energy by flowing over a plurality of water turbines, thereby generating electricity and supplementing electrical power for the local power grid during times of high demand. Additional interior sources of renewable energy may be used to supplement external sources of electrical power in operating the system of the invention.

23 Claims, 8 Drawing Sheets

US 11,639,590 B2
Page 2

Related U.S. Application Data filed on Apr. 5, 2022, provisional application No. 63/297,462, filed on Jan. 7, 2022, provisional application No. 62/327,190, filed on Apr. 25, 2016.

(51) Int. Cl.
*F03B 13/12* (2006.01)
*E02B 9/02* (2006.01)

(58) Field of Classification Search
USPC ........................................ 405/75, 76, 78, 210
See application file for complete search history.

(56) References Cited

U.S. PATENT DOCUMENTS

| | | | | |
|---|---|---|---|---|
| 6,967,413 | B2 * | 11/2005 | Atiya | F03B 13/26 |
| | | | | 290/43 |
| 8,128,318 | B1 * | 3/2012 | Anderson, Jr. | F03B 13/264 |
| | | | | 60/498 |
| 9,741,883 | B2 * | 8/2017 | Haarburger | B65D 88/34 |
| 10,097,131 | B2 * | 10/2018 | Momayez | H02S 10/40 |
| 10,359,027 | B2 * | 7/2019 | Barakat | F03B 13/08 |
| 2001/0028825 | A1 * | 10/2001 | Kinno | F03B 13/268 |
| | | | | 405/76 |
| 2002/0114670 | A1 * | 8/2002 | Kinno | E02B 3/04 |
| | | | | 405/75 |
| 2004/0022584 | A1 * | 2/2004 | Sherman | E02D 17/18 |
| | | | | 405/303 |
| 2012/0237298 | A1 * | 9/2012 | Cook | E02B 9/08 |
| | | | | 405/76 |
| 2013/0266378 | A1 * | 10/2013 | French, Sr. | E02B 9/00 |
| | | | | 405/116 |
| 2014/0197640 | A1 * | 7/2014 | Barakat | F03B 13/08 |
| | | | | 290/54 |
| 2014/0290721 | A1 * | 10/2014 | Haarburger | H01L 31/0445 |
| | | | | 136/251 |
| 2016/0059938 | A1 * | 3/2016 | Momayez | H02S 10/40 |
| | | | | 440/49 |
| 2017/0204738 | A1 * | 7/2017 | Barakat | F03B 13/08 |

FOREIGN PATENT DOCUMENTS

| | | | | |
|---|---|---|---|---|
| DK | 201370267 A | * | 3/2014 | ............ E02B 7/02 |
| EP | 2345809 A1 | * | 7/2011 | ............ F03B 13/06 |
| KR | 100834184 B1 | * | 5/2008 | ............ E02B 7/02 |
| WO | WO-2013044977 A1 | * | 4/2013 | ............ E02B 3/10 |
| WO | WO-2013044978 A1 | * | 4/2013 | ............ E02B 7/12 |

* cited by examiner

METHODS AND WATER RESERVOIR SYSTEMS FOR GENERATING, ACCUMULATING, STORING, AND RELEASING ELECTRICAL ENERGY

CROSS-REFERENCE DATA

This patent application claims a priority date benefit from the U.S. Provisional Patent Application No. 63/297,462 filed 7 Jan. 2022 entitled "Dual-use systems and methods for renewable power generation and protection against rising sea levels", U.S. Provisional Patent Application No. 63/327,498 filed 5 Apr. 2022 entitled "Methods and water reservoir systems for accumulating, storing, and releasing electrical energy", and U.S. Provisional Patent Application No. 63/391,534 filed 22 Jul. 2022 with the same title; all of these patent documents are incorporated herein in their respective entireties by reference.

BACKGROUND

Without limiting the scope of the invention, its background is described in connection with large water reservoirs and systems configured for generating, accumulating, storing, and releasing electrical energy. More particularly, the invention describes an artificially built water reservoir built along a water surface or a large body of water with external walls extending higher than a high tide water level and configured to accept large volumes of water pumped therein. Stored water may be released by flowing through electricity-generating turbines so as to convert the potential energy of a water column to electrical energy, which can then be directed to satisfy the demands of the electrical grid.

Renewable sources of electrical energy are getting more and more popular as an alternative to traditional methods and systems to produce electricity. Solar, wind, and tidal wave power plants of various sizes and capacities are being implemented in various countries and this trend is expected to continue and expand over at least the next decade or more. The growth of renewable energy sources in the global production of electricity is accelerating. Renewable energy capacity, excluding large hydropower plants, increased worldwide by an unparalleled 184 GW in 2019. This was 20 GW more than in 2018. It is worth mentioning that the global capacity in renewable power was 414 GW in 2009, and only ten years later it was around 1627 GW, i.e., it grew more than 3.9 times. Experts further predict that the share of renewable energy sources in the global electrical power generation industry can grow from 15% in 2015 to 63% in 2050. Using wind power as an example, as much as 60 GW of wind energy capacity was installed and placed in service globally in 2019, an increase of 19% as compared to the previous year.

One critical limitation of electricity generation using most types of renewable energy systems is fluctuating nature of produced power: wind power generators depend on the direction and strength of the wind; solar panels are dependent on the availability of direct sunshine, tidal wave power plants depend on the times of high and low tides for their operation. Once produced, electrical energy needs to be consumed right away or stored in some highly efficient form suitable for easy retrieval at a later time. Fluctuating energy voltage and frequency variations put additional stress on power transmission lines, endangering the power grid.

Uneven energy production is only one part of the problem. Varying electricity demand also makes it difficult for power producers to accurately predict and satisfy the energy demands of their customers. In addition to daily, weekly, and monthly fluctuations in power demand levels, seasonal and global fluctuations play a significant role in defining how much energy is needed at a certain time and day.

Balancing fluctuating demand and fluctuating and at times uncertain supply of electricity is not a simple task. Overproduction of electricity, for example, causes significant difficulties with efficient energy storage. Conventional batteries are not very efficient for coping with substantial power production spikes. The need exists therefore for more economical and ecologically friendly methods of storing electrical energy when it is overproduced and releasing this electrical energy to satisfy peak market demands when needed.

Previous attempts to use existing hydroelectric plants are known in the art. During a time of low demand, excess electricity may be used to pump water from low levels back to high levels so it can be used to generate more electricity when needed. These systems have a major limitation of only being available at locations where hydroelectric plants are located, usually in places of high elevations or mountains. For relatively flat locations, which are predominant around the world, these methods of storing energy are not suitable. In addition, renewable wind and solar energy sources are typically deployed in flat areas, such as along a coastline next to a sea or an ocean, and so they may be located far away from existing hydroelectrical plants.

Other known methods used for the storage of produced electricity include electrochemical batteries, flywheel energy storage systems, supercapacitors, and compressed air plants. These technologies did not find widespread use because of their costs, difficulty with deployment on a large scale, environmental risks, and low energy conversion efficacy.

The need, therefore, exists for an efficient and ecologically friendly solution to the problem of balancing the unpredictable production of electrical energy from wind and solar power plants against the varying energy demands of modern cities, especially those located in flat areas along the coastal line.

SUMMARY

Accordingly, it is an object of the present invention to overcome these and other drawbacks of the prior art by providing a novel water reservoir system configured for generating, accumulating, storing, and releasing electrical energy—to act as a component of the electrical power grid designed to smooth over peak energy supply as well as peak energy demand.

It is another object of the present invention to provide a novel water reservoir-based system designed to use water from an abundant body of water to allow accumulating, storing, and releasing of electrical energy.

It is a further object of the present invention to provide a water reservoir system for smoothing over the peaks of energy supply and demand using readily available components and in an environmentally conscious and safe manner.

It is yet a further object of the present invention to provide a method of reducing electrical energy peaks in supply and demand and therefore promote the global use of renewable power sources, in particular, using wind and solar power to generate electricity.

It is yet another object of the present invention to supplement accumulating, storing, and releasing electrical energy by generating additional electrical energy using the facilities of the novel water reservoir system.

The water reservoir system of the invention generally includes a water reservoir with an interior section surrounded by a wall built in an abundant body of water, such as a large lake, a sea, or an ocean. The wall may be built from the bottom of the body of water and extend to a height above a normal water level of the body of water. The water reservoir may contain other components, which together with the wall may be configured to contain, store, and separate water placed within the water reservoir at a different water level from the abundant body of water outside the water reservoir.

The additional height of the water inside the water reservoir may be used to generate electrical power via a plurality of reversible water turbines operably associated with or directly connected to corresponding electrical motors/generators. The water turbines may be configured to direct water between the interior of the water reservoir and the body of water outside thereof.

In embodiments, the water turbines and further configured to operate in an energy generating mode or a water pumping mode, wherein:

the energy generating mode is aimed to produce electrical energy by electrical motors/generators when the water turbines are driven to rotate by water draining from the water reservoir to the body of water outside thereof, and the water pumping mode is aimed to pump water from the body of water into the interior of the water reservoir when the water turbines are driven by the electrical motors/generators associated therewith and energized by electrical energy supplied thereto.

The water reservoir system may further include a computerized controller connected to electrical motors/generators and to an electrical power grid and configured to cause the operation of the water reservoir system in at least one of two operating modes:

accumulating energy by filling the water reservoir with water from the outside thereof using excess electrical energy from the electrical power grid to operate electrical motors/generators of the water turbines, or releasing energy by draining the water from the water reservoir to cause electrical motors/generators to generate electrical energy and supply thereof to the electrical power grid, thereby reducing fluctuations in peak electrical energy supply and peak electrical energy demand of the electrical power grid.

Supplemental electrical energy may be generated while using the water reservoir by utilizing a plurality of floating solar panels, partially or completely covering the interior of the water reservoir and changing their height depending on the present volume of water inside the water reservoir.

Further generation of energy may be provided by a series of wind turbines located along the wall or floating inside the water reservoir in between the plurality of solar panels. In other embodiments, the wind turbines may be connected to water pumps and used to continuously add water to the interior of the water reservoir, which can then be used to generate electricity when drained outside the wall of the reservoir.

A novel method of reducing peak electrical energy supply and peak electrical energy demand for an electrical power grid may include the following steps:

a. providing a water reservoir system comprising a water reservoir with an interior surrounded by a wall built in an abundant body of water from a bottom thereof and extending to a height above a water level of the body of water, the water reservoir system further comprising a plurality of reversible water turbines operably associated with electrical motors/generators, the water turbines are located under the water level of the abundant body of water and configured to direct water across the wall between the interior of the water reservoir and the body of water outside thereof, b. operating the water reservoir system to accumulate energy by filling the water reservoir with water from the abundant body of water using excess electrical energy during peak electrical energy supply of the electrical power grid to operate electrical motors/generators of the water turbines, or c. operating the water reservoir system to release electrical energy during peak energy demand of the electrical power grid by draining the water from the water reservoir to cause electrical motors/generators to generate electrical energy and supply thereof to the electrical power grid.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through the use of the accompanying drawings, in which:

DETAILED DESCRIPTION OF PREFERRED EMBODIMENTS OF THE INVENTION

Figure 1:
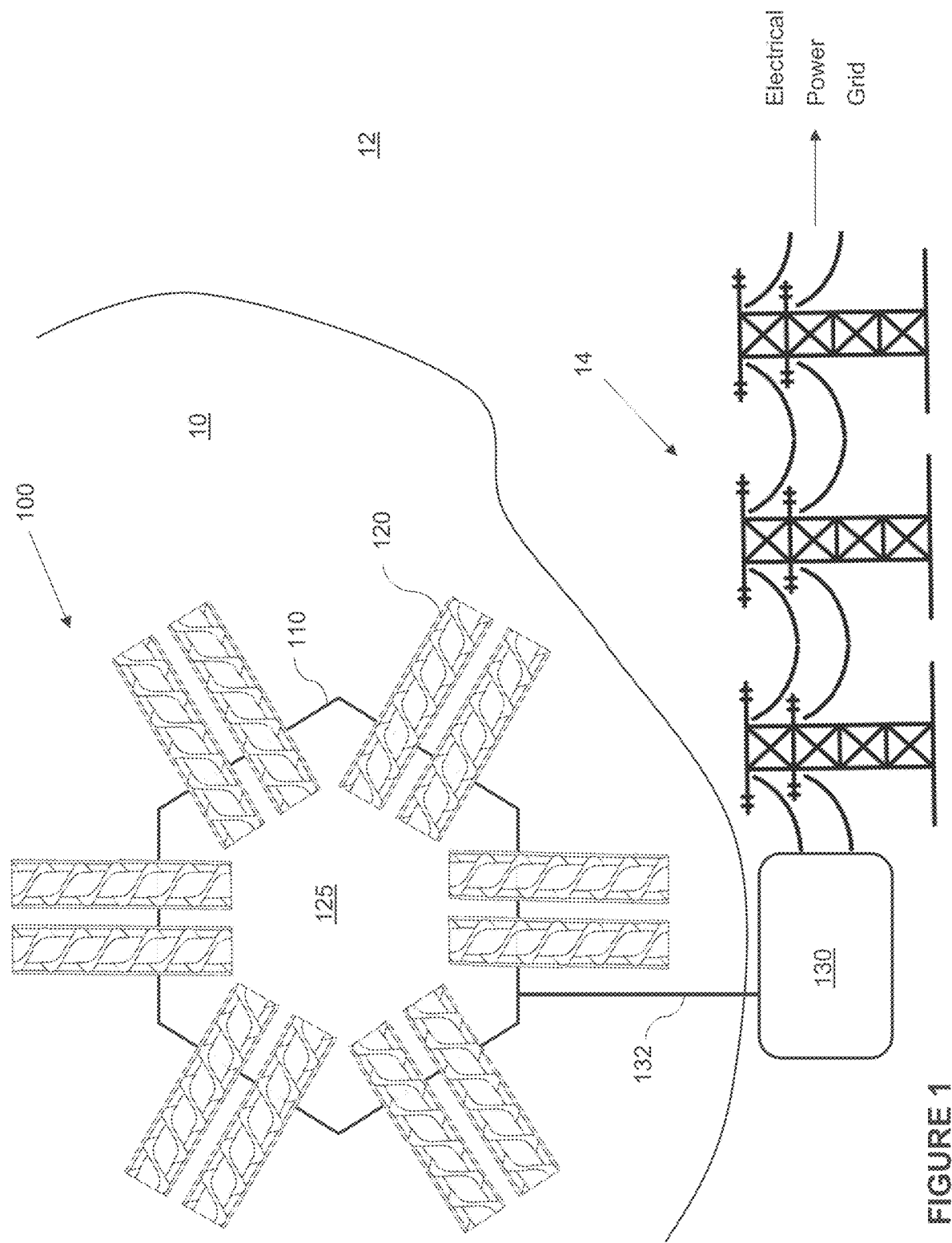
FIG. 1 is a schematic view of the main components of the novel water reservoir system.

The following description sets forth various examples along with specific details to provide a thorough understanding of claimed subject matter. It will be understood by those skilled in the art, however, that claimed subject matter may be practiced without one or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Various embodiments of the present invention are illustrated generally in FIGS. 1 through 7. FIG. 1 shows schematically a top view of the main components of the invention. The first novel step in the building of the water reservoir system 100 is a selection of an appropriate location. As compared to the use of open water reservoirs located at a considerable height above sea level for use at traditional hydropower stations, the present invention teaches to position the water reservoir at the water level associated with an abundant body of water 10. The term "abundant body of water" is used to define a large body of water with easy access to sufficient water volume so as to fill the water reservoir 125 of the invention—all without appreciably changing the water level of the abundant body of water. The abundant body of water may be defined as holding at least 10 times, at least 50 times, at least 100 times, or more water than that needed to fill the water reservoir 125 to the maximum water level. A large lake, a sea, or an ocean are all examples of a suitable abundant body of water.

The water reservoir system 100 may be entirely located within the abundant body of water 10. In other embodiments, the water reservoir wall 110 may be partially located within the abundant body of water 10. In further embodiments, the water reservoir system 100 may be located close to an abundant body of water 10 and comprise a suitably large water pipe system to connect the components thereof and the abundant body of water, so as to provide a low-resistance flow of water in and out of the water reservoir system 100 and the abundant body of water 10. Therefore, for the purposes of this description, the term "a water reservoir with an interior surrounded by a wall built in an abundant body of water" is used to mean a variety of situations where the water reservoir 125 has easy access to the abundant body of water allowing practical movement of large volumes of water between the water reservoir 125 and the body of water 10.

As already evident from the above discussion, the water reservoir system 100 may be built at or close to sea level so as to assure ease of flowing of large volumes of water in and out of the water reservoir. When used with large lakes, the water reservoir system 100 may be built at or near the water level in the lake for similar reasons.

As one of the main objectives of the invention is to smooth out peak power fluctuations in an electrical power grid, another consideration for the location of the water reservoir system 100 of the present invention is to be situated with suitable access to the electrical power grid. FIG. 1 shows schematically the presence of the electrical power line 14 leading to the electrical power grid.

A critical component of the water reservoir system 100 is a computerized controller 130 configured to have electrical communication 132 with all components of the water reservoir system 100 as well as an electrical connection to the electrical power grid. In addition, the computerized controller 130 may be equipped with various sensors required to monitor the operation of the water reservoir system 100 as well as, optionally, the level of electrical power in the electrical power grid. In some embodiments, the computerized controller 130 may be equipped with one or more sensors indicating the level of water inside water reservoir 125, and outside the water reservoir 125, as well as the electrical activity of all major components of the system of the present invention. The computerized controller 130 may be further equipped to receive signals from the electrical power grid indicating the level of the electrical energy supply and demand therein, for example, to receive a call for using excess electrical energy to pump water into the water reservoir, or a signal to release electrical energy to supplement electrical energy available in the power grid from other sources when the demand level for electrical power is high.

FIG. 1 also shows an exemplary wall 110 erected within the abundant body of water 10 close to the shoreline of the shore area 12. Reservoir wall 110 may be built on the bottom of the body of water 10 and extend to a height exceeding the normal water level of the body of water. This allows separation of the water inside the water reservoir 125 from the water outside the wall 110, accumulation and storage of the water inside the water reservoir 125 at a water level exceeding the water level in the surrounding waters of the abundant body of water 10.

The bottom of the body of water 10 located within the boundaries of the water reservoir 125 needs to have sufficiently low water permeability so as to not allow water to passively drain from the water reservoir 125 to the outside body of water 10, which may be caused by a difference in water levels inside and outside the water reservoir 125. In the case of sandy sediment covering the bottom of the water reservoir 125, there may not be a need to take any measures to seal the bottom. Water seepage through the bottom of the reservoir is governed by the Darcy law. With an exemplary radius of the water reservoir 125 at one or several kilometers, the size of the grain of sand of about 1-2 mm, and the depth of sediment at about 100 meters, calculations show that the rate of leakage would not exceed about 1% of the volume of the water reservoir per day, making additional sealing efforts unnecessary.

Still, in other circumstances, bottom sealing may be advisable or even required. The present invention may take advantage of the plastic waste recovered from the body of water 10 as a base material for making the sealing cover. Since the quality of the plastic film does not need to be exceptional and the only requirement is to reasonably seal the bottom surface of the water reservoir, a bottom film made from a composite recycled waste plastic material may be advantageously used to accomplish that objective.

One or more reversible water turbines 120 may be positioned across the wall 110 to direct water in and out of the water reservoir 125. Any suitable designs may be used for this purpose, for example, axial flow water turbines. Each turbine may be equipped with or otherwise associated with an electrical motor/generator. When the motor is powered up with electrical power, the water turbine may act as a water pump to pump water from the body of water 10 into the water reservoir 125. In reversed conditions, when the water is drained from the water reservoir to the outside body of water 10 (based on a higher water level inside the water reservoir as compared to the water level outside thereof), the water turbines may be configured to be rotated by the water draining and cause the motor/generators to generate electrical power, which can be directed to supplement the electrical power in the electrical power grid.

In some embodiments, water turbines 120 may be placed directly across the wall 110 at a level at or lower than the water level of the body of water 10. A plurality of such water turbines 120 may be located throughout the periphery of the reservoir wall 110 as seen in FIG. 1.

The shape of the reservoir wall 110 may be selected to be appropriate for local conditions. It may be preferable to build it using as many straight sections as possible to reduce the cost of construction.

Figure 1A:
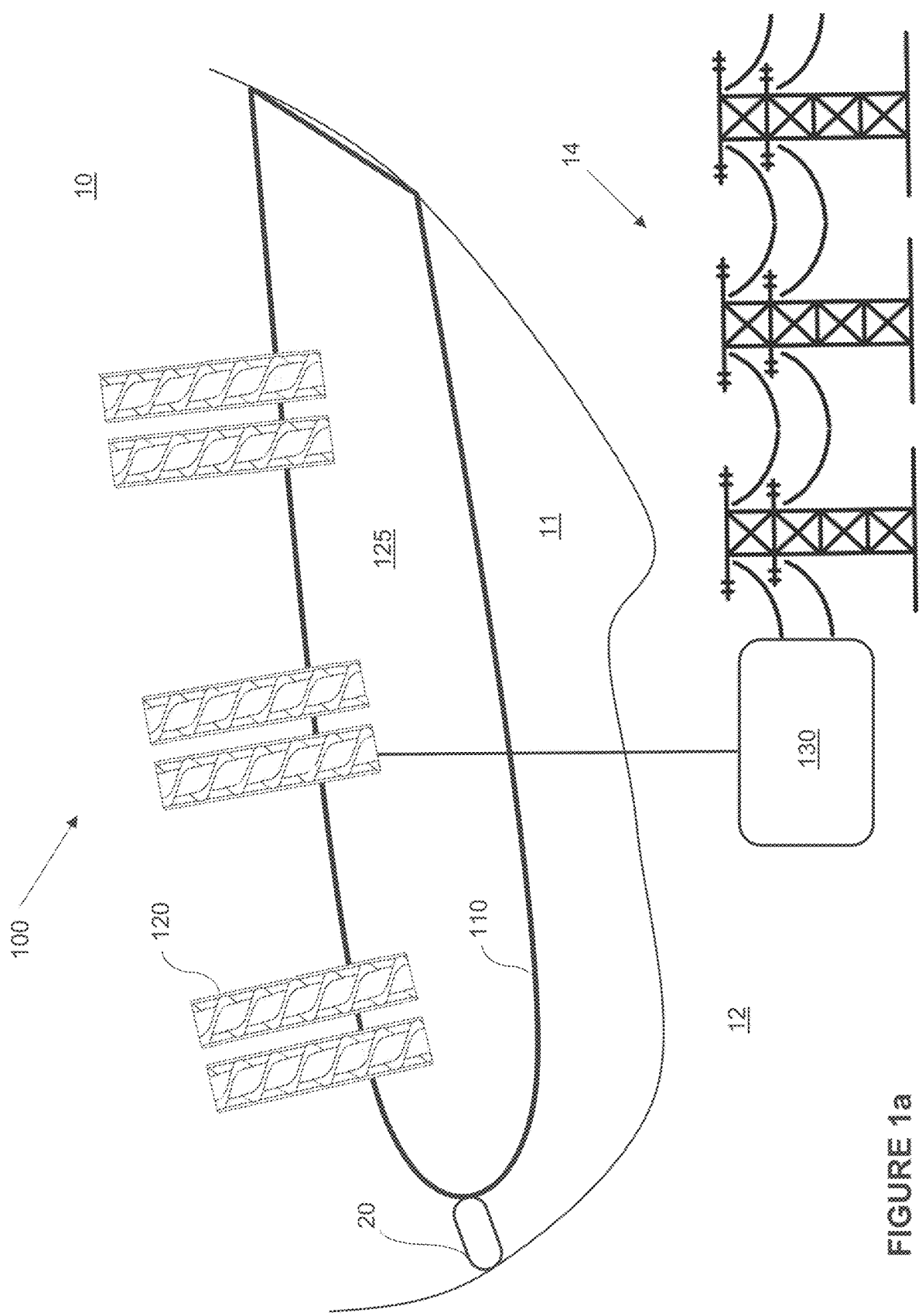
FIG. 1a is the same but with a shape of the reservoir wall designed to protect local shore areas from flooding.

In other special situations, the shape of the reservoir wall may be selected to serve additional purposes. In one example shown in FIG. 1a, the wall 110 is extended to connect two higher points of the shoreline and protect the local area 12 from flooding, for example as a result of global warming causing a rise in water levels. In such situations, the construction of a protective wall is necessary to protect local areas. Building the water reservoir system 100 may cause only a small increase in the budget as compared to building a conventional protective wall, but with an additional evergreen benefit of facilitating the use of renewable energy sources. Water turbines 120 may be located along the outer portion of the wall facing the open body of water so as to not cause additional water inflow into the protected areas 11 with a lower level of the water therein. A water lock system 20 may be also provided to allow ships to enter the local ports if needed.

Figure 2:
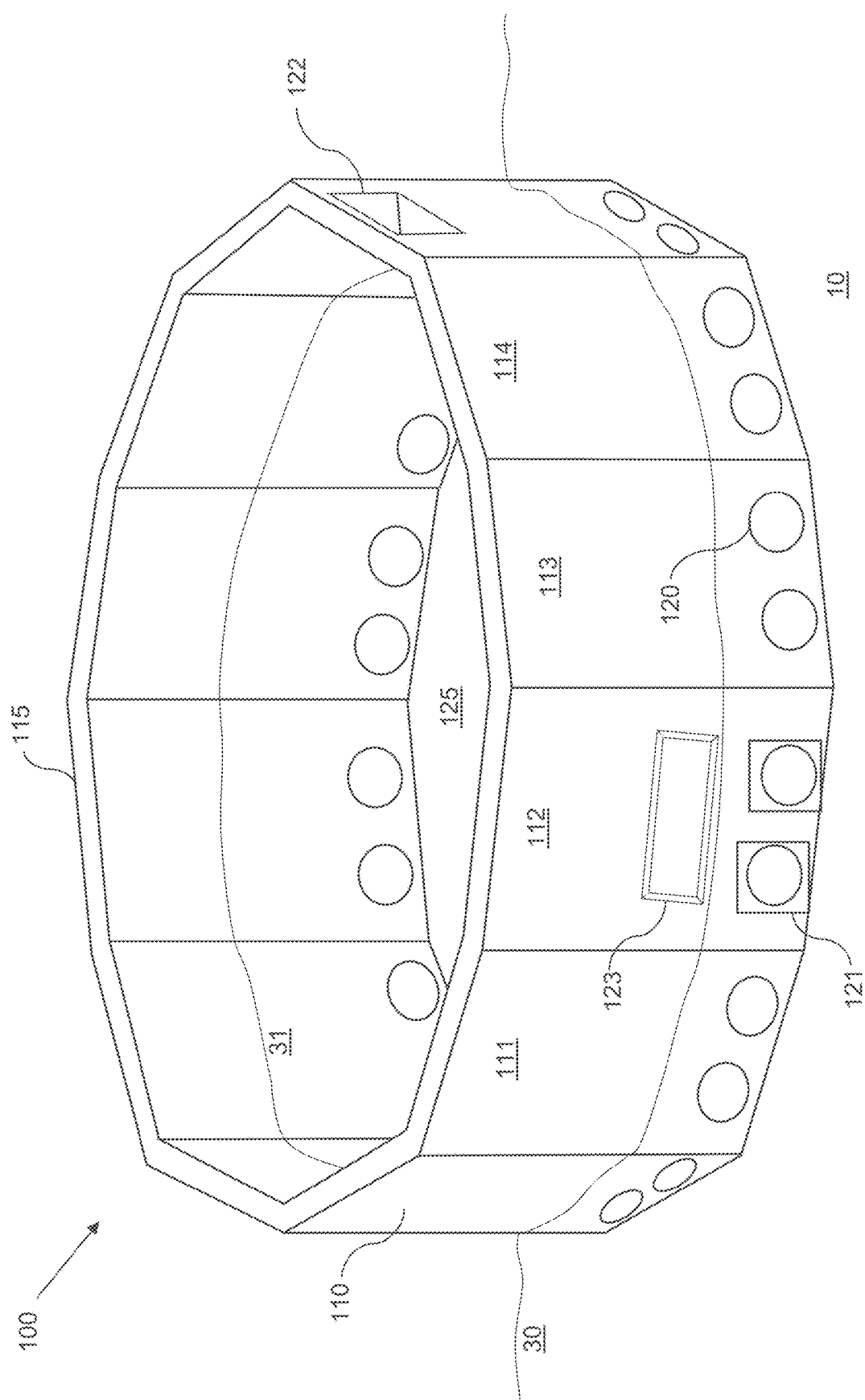
FIG. 2 is a general perspective view of a first embodiment of the invention.

A general perspective view of the first embodiment of the water reservoir system 100 is seen in FIG. 2. The reservoir wall 110 may be erected in a shape of a polygon with sections 111, 112, 113, 114, and so on. Generally speaking, the shape of the water reservoir 125 close to that of a circle may be preferable as it encloses the most inner area for a minimal length of the wall, therefore minimizing construction costs. As constructing straight walls is more economical than curved walls, a form of a polygon may offer the advantages of surrounding the most area for the lowest cost of construction. Individual sections of the polygon may not be of even length so as to accommodate local conditions, as may be understood by those skilled in the art.

The wall 110 may be built in a relatively shallow and flat area of the body of water 10 and close to the shore, such as a bay area for example. Building the wall 110 exposed at least along a portion thereof to ocean water and on top of a reasonably flat seafloor is advantageous as there will be required only minimal preparation work on the floor of the water reservoir 125 (such as smoothing uneven surfaces) so the cost of construction of the entire system is dictated primarily by the linear (per kilometer) cost of the wall, in addition to all equipment.

Location of the water reservoir 125 may be selected to account for water level and low tide and high tide if the water reservoir is constructed at the sea or an ocean. The wall 110 may be constructed to exceed the high tide level 30 by a predetermined difference so as to store a sufficient volume of water to operate efficiently as a buffer for power fluctuations of the electrical power grid. In embodiments, the wall height may exceed the high tide water level 30 by at least 1 m, at least 2 m, at least 3 m, at least 4 m, at least 5 m, at least 6 m, at least 7 m, at least 8 m, at least 9 m, at least 10 m, at least 15 m, at least 20 m, at least 25 m, at least 30 m, at least 40 m, or even higher depending on other factors, as the invention is not limited in this regard.

The overall height of the wall 110 defines the range of the water level 31 that may be utilized for pumping water into the reservoir or draining water out of the reservoir. The minimal level of water may be designated to be at or above the low tide water level 30 outside the wall 110. In further embodiments, the minimal water level 31 may be designated to be slightly above the water level 30, such as above by at least 10 cm, at least 30 cm, at least 50 cm, at least 70 cm, at least 100 cm, or another distance as appropriate for local conditions.

The maximum level of water 31 may be designated to be below the top of the wall 115 by at least 30 cm, at least 50 cm, at least 70 cm, at least 100 cm, or by another appropriate distance. The distance between the maximum level of water 31 at the top of the wall 115 may be necessary to avoid flooding of the top 115 due to waves inside the reservoir which may be caused by strong winds. In other circumstances, spillover protection may be necessary to avoid uncontrolled excessive pumping of water into the reservoir in case of equipment malfunction. To assure safety, one or many passive spillover openings 122 may be located at one or at several places along the wall 110 and configured to direct spillover water back to the body of water 10 outside the water reservoir 125. The size of these openings may be selected to assure sufficient draining capacity to safely relieve any unanticipated overflow conditions.

Further safety provisions may include one or more spill gates 123, which may be opened or closed by the computerized controller 130. These spill gates are intended to be closed all the time, except in emergency conditions, such as an upcoming hurricane or an unavoidable collision with a large ship, which may cause a breach in the wall, or for maintenance purposes. Safe and rapid reduction in water level 31 to that close to or at the level 30 outside the wall by dumping water outside the water reservoir 125 may be used to avoid abrupt and uncontrolled spillage of large volumes of water in case of an unanticipated event that poses a risk of a wall breach.

One, two, or a plurality of water turbines such as reversible water turbines 120 may be positioned to direct the flow of water across the wall 110. The water reservoir system 100 may include more than one turbine 120, such as at least 5, at least 10, at least 20, at least 30, at least 40, at least 50, at least 75, at least 100, or even more of the water turbines, as the invention is not limited in this regard. In some embodiments, water turbines 120 may be positioned directly across the wall 110 and below the water level 30 of the body of water 10. In other embodiments, the water turbines 120 may be positioned inside the water reservoir or outside thereof and provided with a water pipe to expose one side thereof to the water inside the water reservoir 125 and the other side thereof to the water outside thereof, depending on local conditions and preferences. In further yet embodiments, the water turbine 120 may be positioned at or even above the water level 30 and be equipped with a water-filled conduit to connect the water turbine to water on both sides of the wall 110, as the invention is not limited in this regard. Suitable screens may be installed at the outlet of water turbines 120 to avoid local fish and other living organisms or other objects from being sucked into the turbines when operating in a water pumping mode.

Each water turbine 120 may be equipped with an electrical motor/generator, which operates either as a motor or a generator depending on the mode of operation of the water turbine. When the water turbine 120 is used as a water pump, the motor is operated by supplied electrical power, and the water turbine is rotated in a manner to direct water to raise the water level inside the water reservoir 125. When the water is drained from the water reservoir, the water turbine may be used in reverse, namely to be driven by the water flow and to rotate the shaft of the motor/generator to cause the generation of electrical energy.

Water flowing into and out of the water turbines 120 may be controlled by at least one electrically operated sluice 121, which may be located either at the entrance of the water flow into the water turbine or at its exit. More than one sluice may be used, for example, to completely isolate the water turbine from operation at both the entrance and the exit of the water flow—such as to allow a repair or maintenance to be performed from time to time.

As a substantial portion of wall 110 is expected to be above a normal water level, it will be visible from a shoreline. The exterior of the wall may be painted or otherwise colored in neutral or water-like colors so as to diminish the contrast between wall 110 and the surrounding water. In other embodiments, the exterior of wall 110 may be pained as an island to better blend with the local environment. In further yet embodiments, the exterior of wall 110 may include locations designated for advertisement or other visual messaging to the observers from the shore or from a watercraft passing along the wall.

Various materials may be used for the construction of wall 110, as known by those skilled in the art. In some embodiments, the entirety of wall 110 may be made from the same materials, while in other embodiments, wall 110 may be constructed by connecting existing sections and repurposed structures as may be available with intermediate portions of the wall made from various available local materials. Importantly, the structural integrity of wall 110 must be sufficient to hold the water inside the reservoir at a height exceeding the water level outside the reservoir.

The top edge 115 of the wall 110 may be enlarged and converted to be a boardwalk, a path for walking or bicycling along thereof, a road for vehicles such as technical service vehicles, or for another useful recreational activity. Trees may be placed along the wall 110 to further improve the appearance of the water reservoir system 100 as a stand-alone island.

In operation, the water reservoir system 100 may be used in an energy-generating mode or a water-pumping mode. The computerized controller 130 may be configured to select the mode of operation depending on the balance of the electrical energy supply and demand in the electrical power grid. In particular, the computerized controller 130 may detect the condition or receive a first signal from the electrical power grid indicating that the electrical energy supply is exceeding the demand for such energy and that excess electrical power is available and in need of accumulating and storing until the demand for electrical energy increases. Alternatively, the computerized controller 130 may be able to receive the signal or detect the condition of the electrical power grid when the electrical energy in the electrical power grid is exceeding a predetermined peak supply threshold. In either one of these cases, the computerized controller 130 may be configured to initiate the operation of the system of the invention in the water pumping mode.

The objective of operating the system of the invention in the water pumping mode is to utilize an excess of electrical power to pump water into the water reservoir, assuming that the current water level 31 at that point is below the maximum safe level. If this is the case, the computerized controller 130 may activate one, two, or more of the available water turbines to start pumping water from the body of water into the water reservoir 125 with the aim of increasing the water level in the water reservoir 125. The excess electrical power is directed from the electrical power grid to operate the motors/generators of any suitable number (from one to all) of the water turbines to achieve a higher water level 31 inside the water reservoir 125. The computerized controller 130 may be used to continuously monitor the conditions of the electrical power grid and receive signals from the electric grid. When the appropriate signal is received or the excess in electrical power is detected as subsiding, the computerized controller 130 may stop the operation of some or all of the water turbines 120 in the water pumping mode. The water turbines 120 may also be slowed down or stopped as the water in the water reservoir 125 reaches the maximum level.

Once the computerized controller 130 receives the appropriate signal or detects that the power balance at the electrical power grid is stabilized (for example by detecting that the electrical energy levels are above the predetermined peak demand threshold and below the predetermined peak supply threshold), it may be configured to stop all water pumping, close all sluices, and operate the system of the invention in a simple water storing mode for subsequent generating of electrical energy when the need for electrical energy is identified. In other embodiments, if there is an expectation of further spikes in the supply of electricity, the computerized controller 130 may initiate partial drainage or complete drainage of water in the energy generating mode if it is desirable to supplement the electrical power grid with the electrical energy generated by the water reservoir system 100.

The energy generating mode is aimed to produce electrical energy by electrical motors/generators when the water turbines 120 are driven to rotate by water draining from the water reservoir 125 to the body of water 10 outside thereof. High demand for electrical power may be predictable and repeatable such as electricity consumption by air conditioning systems connected to the power grid during hot summer months. In this case, the computerized controller 130 may be configured to operate the water reservoir system 100 in the energy-generating mode based on a certain schedule. In other cases, such a spike in demand may not be predictable. In these cases, the computerized controller may initiate the operation of the system 100 in the energy generating mode upon receiving a corresponding request such as a second signal from the electrical power grid or upon detection of electrical energy in the electrical power grid falling below a predetermined peak demand threshold. The predetermined peak demand threshold may be lower than the predetermined peak supply threshold when characterizing and monitoring the electrical power grid or receiving appropriate signals.

The energy generating mode may be characterized by opening the respective sluices to cause one, two, or more turbines 120 as appropriate to rotate based on the water level difference between the water in the reservoir 125 and outside the wall 110. The computerized controller 130 may be configured to optimize the number of operating water turbines 120 depending on the demand for electrical power from the electrical power grid and the water level 31 available in the water reservoir 125, as not all water turbines 120 may be operated at all times. All electrical power generated by the motors/generators of the water turbines 120 may be directed to supplement the electrical power in the electrical power grid and satisfy an increased demand for electrical power. Generation of electrical power may continue until either there is no more water available to be drained from the water reservoir 125 or until the conditions in the electrical power grid are changed and the electrical energy from the water reservoir system 100 is no longer required.

The water reservoir system 100 may also be operated as a tidal wave basin electrical generator by allowing water to passively enter the water reservoir at high tides and drawing the water to operate the water turbines 120 in the energy generation mode during low tides.

In addition to providing supplemental electrical energy to reduce fluctuations of demand and supply for the electrical power grid, the electrical energy developed by the present invention may be directed to other useful local purposes, for example, to energize a local desalinization plant, which may be located within the boundaries of the wall 110 or somewhere else nearby. The generation of fresh potable water may be used to send the water via a suitable pipeline to feed the local area residents with high-quality freshwater. This alternative use of electrical energy generated by the water reservoir system 100 may be activated when excessive electrical energy consistently exceeds the supply needs and too much water is accumulated in the water reservoir 125. Another alternative use of excess electrical energy may include generating hydrogen from the water taken from the body of water 10. Hydrogen produced in a nearby plant may be used to power automobiles or for other useful purposes.

Figure 3:
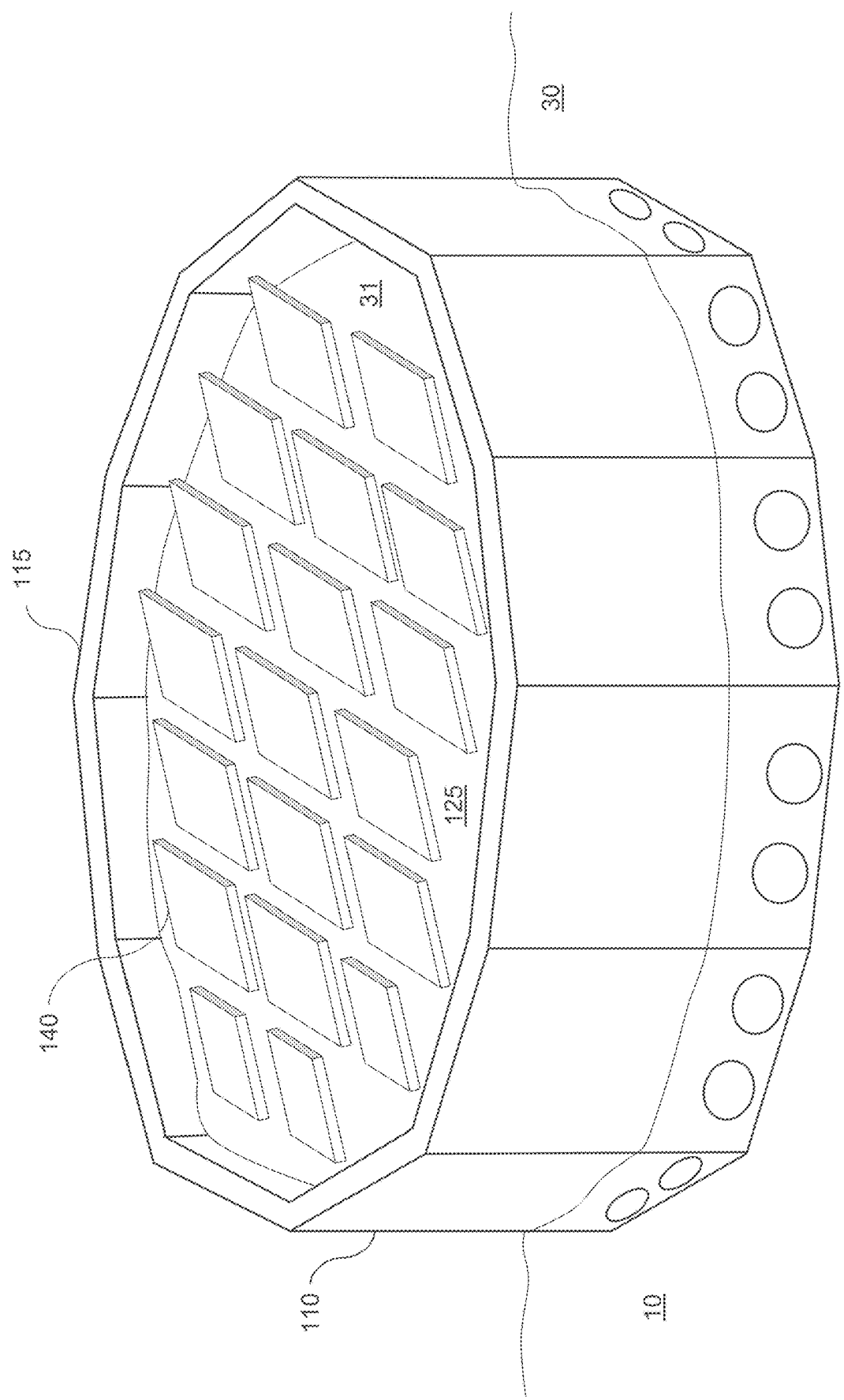
FIG. 3 is a general perspective view of a second embodiment of the invention.

FIG. 3 shows a second embodiment of the present invention aimed at using the top water surface inside the water reservoir 125 as a basis for floating solar panels in order to generate additional electrical power independent of the excessive power which may or may not be available from the electrical power grid. As the area of the water inside the water reservoir 125 is expected to be substantial, and the water inside the reservoir is not subject to high and low tides or waves and other ocean disturbances, it may offer an advantageous flat surface to locate one or more floating solar panels 140.

Any suitable design of a solar panel may be used for the purposes of the invention. The solar panels 140 may be mounted on floating bases and arranged to cover as much of the area inside the water reservoir 125 as desired. The panels may be inclined at a consistent angle selected to maximize solar exposure in a given area. In other embodiments, the solar panels may be adjusted throughout the day to maximize solar exposure even further.

A system of flexible cables may be used to electrically connect individual solar panels 140. Since the water level 31 is expected to fluctuate between the minimum level and the maximum level, the cables may be selected to allow for the level change for at least some or all of the solar panels 140 not only in between these water levels but also in a broader range to further increase the safety of their operation, such as from the bottom of the water reservoir to the top of the wall 115. This may be done to avoid damage to the solar panels in case the water level accidentally goes outside its designed and predicted limits and provide uninterrupted electrical connections for one or more solar panels regardless of water levels.

As with other solar panel systems, the generation of electrical power may not be entirely consistent and predictable when using solar panels 140. The computerized controller 130 may be configured to use the generated electrical power using the following priorities:

when operating in energy generating mode, direct some or all supplemental electrical power from the solar panels to supplement the electrical power of the water turbines 120 and supply the electrical power grid with maximized electrical power;

as the demand for electrical power subsides, continue to direct all electrical power from solar panels toward the electrical power grid, reduce the use of water turbines 120 to conserve drained water, and preserve the water level inside the reservoir 125 to be as high as possible;

as demand falls further, direct only the electrical energy from the solar panels 140 and stop draining water from the water reservoir 125;

in stable power conditions, direct electrical power from solar panels either toward the grid or to operate the water turbines 120 in the water pumping mode, depending on the level of water in the reservoir as well as on anticipated daily or weekly fluctuation in electrical power demand, if any;

when excess electrical power is available, first use electrical power from the solar panels 140 and then use excess electrical power from the electrical power grid to operate the water turbines in the water pumping mode and raise the level of water in the water reservoir 125;

if the water level is high and there is still no demand for electrical power from the electrical power grid, operate the local desalinization plant or the hydrogen production plant to use electrical power from the solar panels 140.

Other operational principles may be used depending on local conditions and objectives for the water reservoir system 100 of the present invention.

Figure 4:
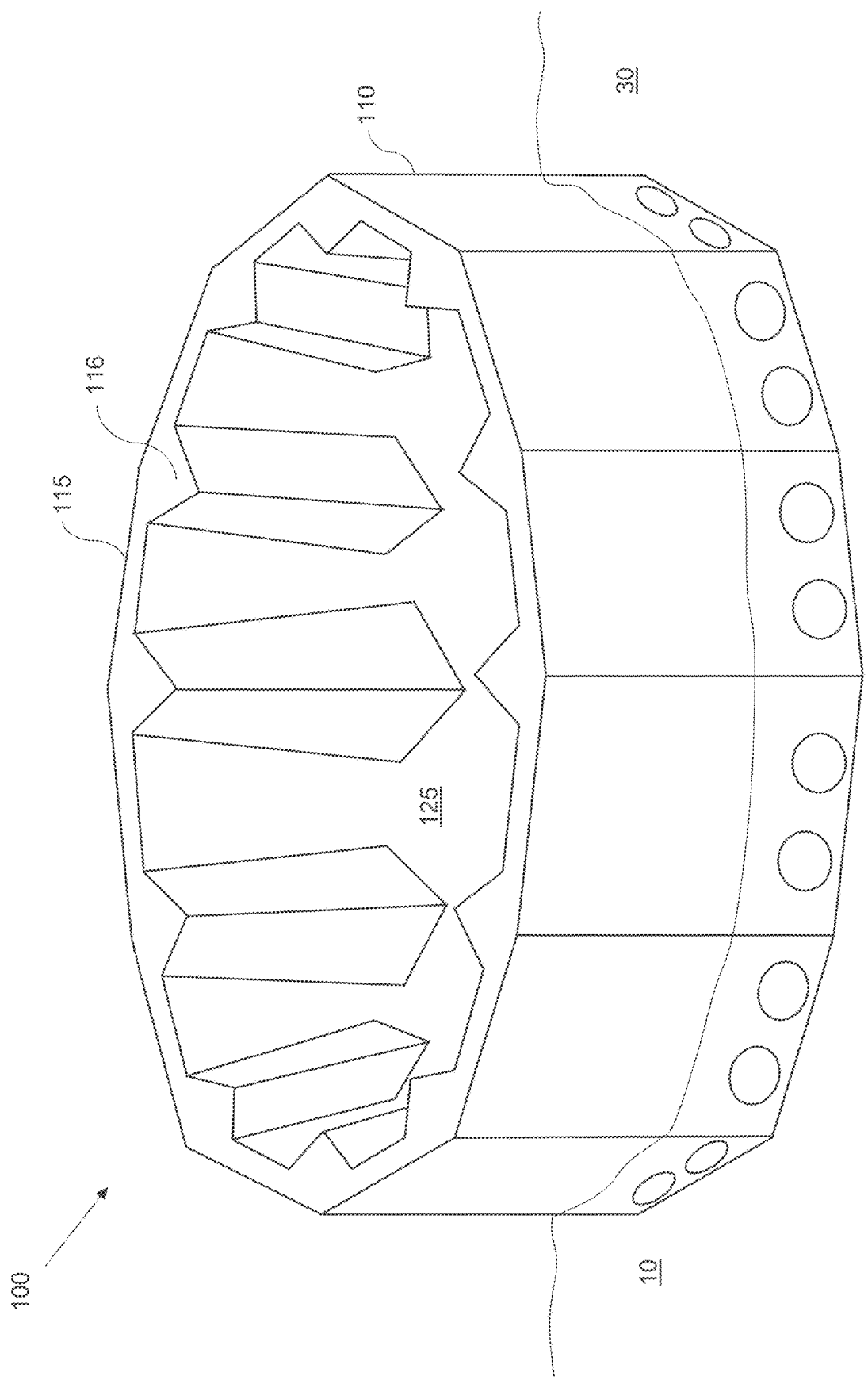
FIG. 4 is a general perspective view of a wall design suitable for a third embodiment of the invention.
Figure 5:
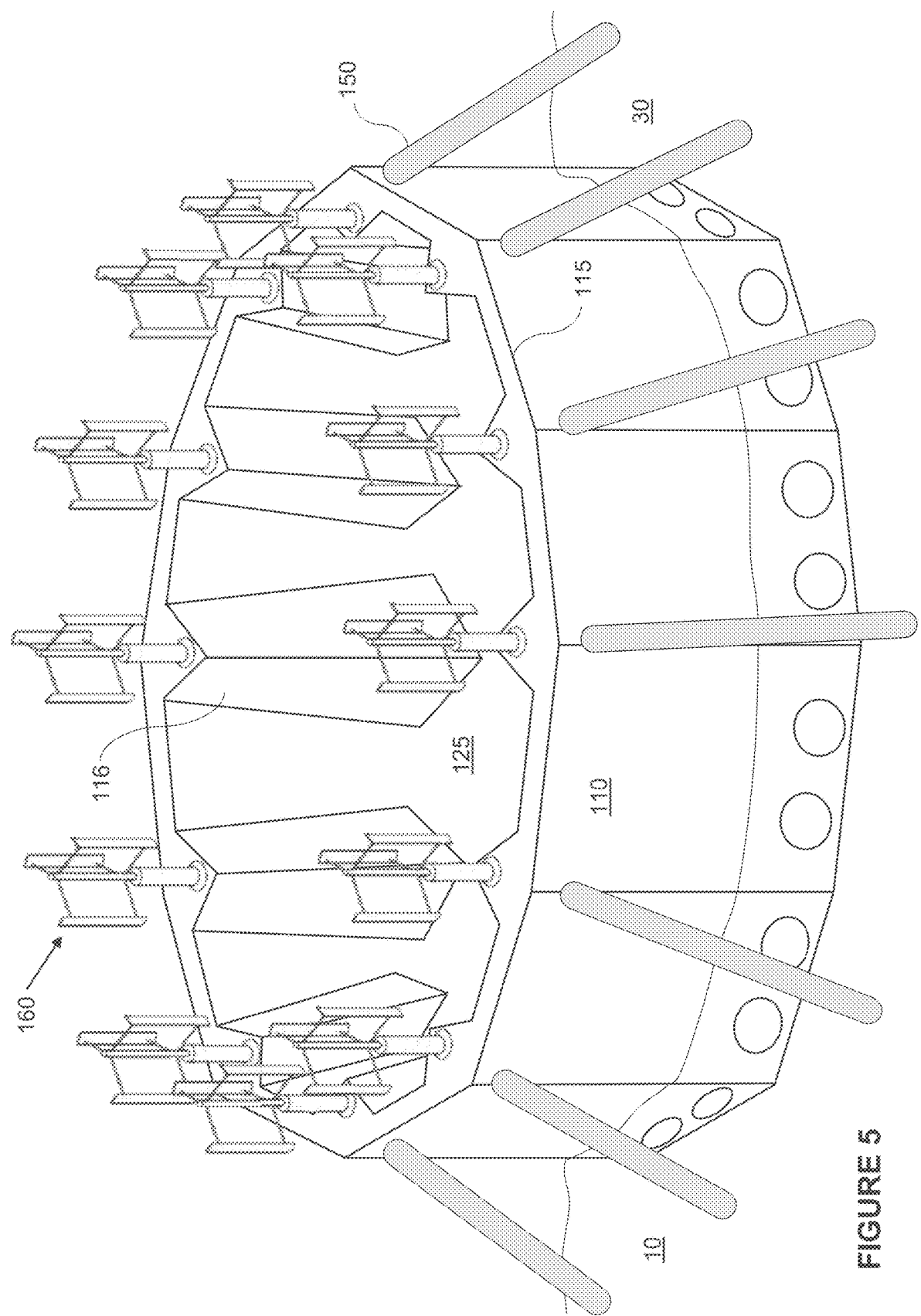
FIG. 5 is a general perspective view of a third embodiment of the invention.
Figure 6:
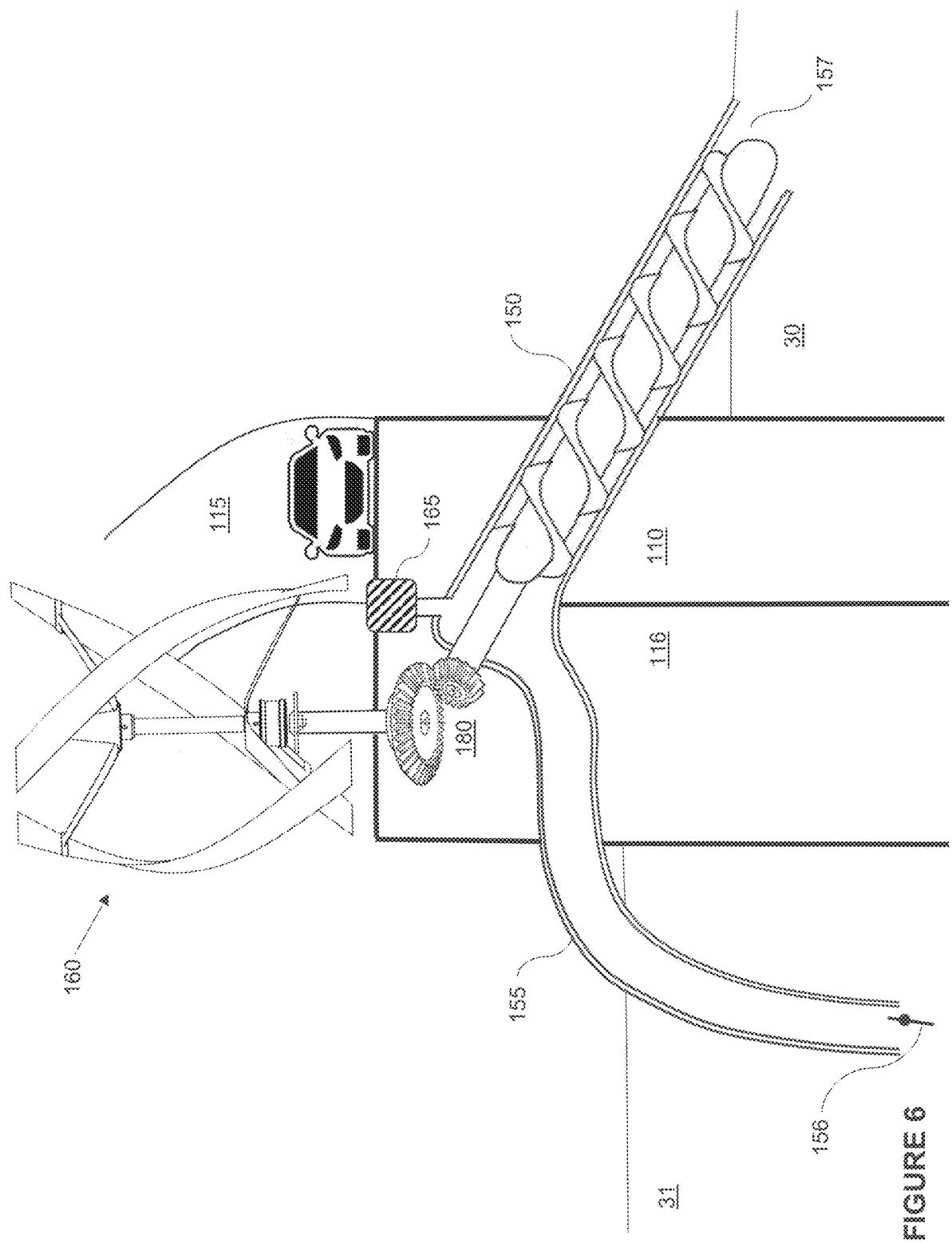
FIG. 6 is a cross-sectional view of a wall and a tower of the third embodiment of the invention.

FIGS. 4 through 6 show various views of the third embodiment of the present invention, in which wind power is used to operate additional water pumps to pump water into the reservoir independently from the operation of the water turbines 120, whether they operate in the water pumping mode or the energy generating mode. This embodiment includes one, two, or more additional water pumps 150 operated by tower-based wind turbines 160.

In embodiments, a series of towers 116 may be constructed during the building of the wall 110 in order to support the wind turbines 160. FIG. 4 shows that these towers may be positioned along the wall 110 at one, two, or more vertices of the polygon-shaped reservoir wall 110. In other embodiments, these towers may be positioned along the wall 110 in other places, for example at locations of maximum wind, as the invention is not limited in this regard. The towers 116 may extend from the bottom of the water reservoir 125 to the top of the wall 115. When constructing the wall, these towers may be built at the same time by pouring cement in a shape of a wall and the tower forming the same structure.

Water pumps 150 may be located to deliver water from the external abundant body of water 10 to the interior portion of the water reservoir 125. Archimedes screw rotary pumps may be advantageously used for this purpose although other water pump designs may be used as well depending on local circumstances. One advantage of the Archimedes type axial flow rotary pumps is the broad range of rotational speeds that these pumps may operate in, which is useful for driving these pumps using wind turbines. Axial flow water pumps may be located at an inclined angle to the water wall 110, see FIGS. 5 and 6.

A variety of axial flow pumps may be used for the present invention. One useful example of a commercially available axial flow pump is that produced by FishFlow Innovations Inc. (Medemblik, Netherlands). In embodiments, the pipe containing the pump axil flow screw may be positioned with an entrance opening 157 under the water level 30 at low tide so as to allow the intake of water to be available at all times regardless of the high or low tide levels. The pump 150 may be attached at the top and retained in its position by being built into the top portion of the wall 110. Operation of the pump is conducted by driving its main shaft via a gearbox 180 using a vertical wind turbine 160.

The choice of a vertical wind turbine is not the only available design option as other sources of rotational power may be used, for example, horizontal axis wind turbines. The advantage of the vertical wind turbine approach is that it works over a broad range of winds and these devices can be positioned next to each other without much interference from one wind turbine to the adjacent one. Several types of rotors are contemplated for use as wind turbine 160, including the H-Darrieus type rotor seen in FIG. 5 or a helical type rotor seen in FIG. 6. The vertical shaft of the wind turbine may enter the gearbox 180 and be transformed into an inclined driving shaft connected to the rotor of the axial flow water pump 150. The gearbox 180 may be located outside the water flow so it is not subject to corrosion by salt water and is easily accessible for technical repairs and maintenance above the water level 31.

Water flow through the water pump 150 is arranged using the water pipe 155 with an exit port which may be located below the minimum water level 31. The water pipe 155 may further include a one-way valve 156 at the exit port or at other locations in the water pathway. This is designed to preclude a reversal of water flow direction when the pump 150 is stopped or slowed down.

Once the water path is completely filled with water (for example using a top access and vent opening 165, a one-way siphon system may be formed between the water level 30 outside the water reservoir 125 and the interior water level 31. Rotation of the water pump 150 causes the water to be pumped from the body of water to fill the water reservoir 125. This happens at all times when the wind is blowing in any direction with at least some minimal speed. Importantly, the process of operating the water pumps is independent of the process of operating the water turbines 120, in other words, the water is being pumped into the reservoir regardless of whether the water turbines 120 are operated in the energy generating mode or in the water pumping mode. This approach further increases the efficacy of the entire water reservoir system 100.

Another advantage of forming a siphon system is that it will work independently of the water levels 30 and 31. Furthermore, as the tide rises, the pressure head for pumping water decreases making the water pump more productive. At the same time, as the water level 31 inside the water reservoir changes up or down, the water pumps 150 use only the necessary energy to lift the water from the body of water 10 into the water reservoir 125 and not waste any energy as with other open-ended axial flow pumps.

Although FIG. 6 shows one wind turbine 160 operating one water pump 150, the invention is not limited to this configuration. Depending on local conditions, one wind turbine 160 may be adapted to cause the operation of more than one water pump, for example by using another gearbox configured to drive more than one water pump shafts. In other embodiments, energy from more than one wind turbine may be combined to operate a single large water pump, as the invention is not limited in this regard.

Operation of the water pumps 150 may continue independent of the use of water turbines 120 as mentioned above. The computerized controller 130 may be used to monitor the performance of the water pumps 150 and the wind turbines 160 by detecting the wind strength and detecting water production from the water pumps 150 but since there is no electricity directly produced between the wind turbines 160 and the water pumps 150, the computerized controller 130 does not have any further involvement in their operation.

Figure 7:
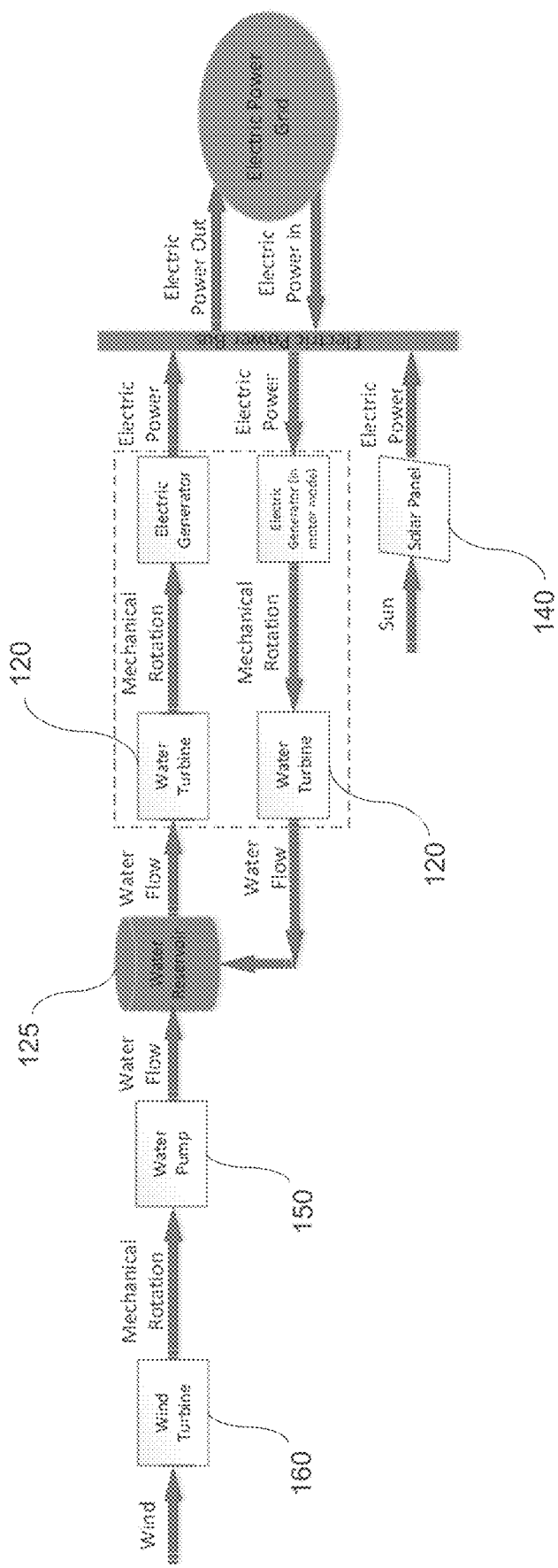
FIG. 7 is a block diagram of the flows of various forms of energy throughout the water reservoir system of the invention.

In further embodiments, various elements of all the previous embodiments may be combined together to achieve the highest efficacy of the operation. FIG. 7 shows a block diagram of energy flow of various types through the system comprising the water reservoir 125, water turbines 120 with associated electrical motors/generators, solar panels 140, as well as wind turbines 160 operating water pumps 150.

In a broad sense, the invention is an integrator of various energy sources available from an abundant body of water such as an ocean. In a typical example, tidal, wind, and solar energy are used to provide supplemental electrical power. Other sources of energy available in the ocean can also be used with the present invention.

One additional source of energy in locations with high and low tides is a wave energy converter. If the wind speed exceeds the speed of a water wave, more energy is transformed into wave energy. Capturing this energy for the purposes of pumping more water into the reservoir or directly producing electricity may be done using one of several approaches utilized by various wave energy converters, namely via point absorber buoys, surface attenuators, oscillating water columns, or overtopping devices. In addition, wave concentrators may be used in the shape of long floating arms extended at an angle outward of the reservoir wall 110 and designed to reflect and concentrate ocean waves from a broad area around the wall towards one or more specific wave energy concentrators that may be attached to or incorporated with the water reservoir wall 110.

In a broad sense, the water reservoir system of the present invention has a number of important advantages as follows:
 provides a consistent output of electrical energy
 provides a missing component to enable broad use of renewable energy sources
 simple to build, operate, and maintain
 works at high efficacy over a broad range of wind speeds
 provides independent operation for water pumping into the water reservoir and electricity generation by the water draining therefrom
 safe in operation
 can be built practically anywhere along the shoreline, does not need special natural conditions
 can be operated as a stand-alone renewable source of electricity or as a part of a broader electrical power grid.

The present invention will therefore support increased integration of renewable electric power (mostly solar and wind) and will enable the provision of additional ancillary services to the electric grid that will increase in value as more renewable sources of electricity generation become deployed and connected to the existing electrical power grid.

Importantly, there is no need for large-scale use of batteries for storing excess electrical energy, which are expensive, have poor storage and release efficiency, and have significant environmental risks if damaged.

In addition, by smoothing out peaks and valleys of energy consumption, the system of the invention would provide an instant economic benefit, since an output of consistent electrical power supply can be offered at a higher price than excessive peaks and valleys of electrical power production that can be purchased for the input to the system of the present invention at much lower prices.

It is contemplated that any embodiment discussed in this specification can be implemented with respect to any method of the invention, and vice versa. It will be also understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference. Incorporation by reference is limited such that no subject matter is incorporated that is contrary to the explicit disclosure herein, no claims included in the documents are incorporated by reference herein, and any definitions provided in the documents are not incorporated by reference herein unless expressly included herein.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, Aft AC, BC, or ABC, and if the order is important in a particular context, also BA, CA, CB, CBA, BCA, ACB, BAC, or CAB. Continuing with this example, expressly included are combinations that contain repeats of one or more items or terms, such as BB, AAA, Aft BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12, 15, 20 or 25%.

All of the devices and/or methods disclosed and claimed herein can be made and executed without undue experimentation in light of the present disclosure. While the devices and methods of this invention have been described in terms of preferred embodiments, it will be apparent to those of skill in the art that variations may be applied to the devices and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

What is claimed is:

1. A water reservoir system for accumulating, storing, and releasing electrical energy, the water reservoir system comprising:
   a water reservoir with an interior surrounded by a wall built in an abundant body of water from a bottom thereof and extending to a height above a water level of the body of water, wherein a bottom of the water reservoir remains open, the water reservoir has a diameter or width at or above 2 km, the wall is configured to contain, store, and separate water within the water reservoir from the abundant body of water outside the water reservoir, the water reservoir is located where the bottom of the abundant body of water contains a layer of sandy sediment with sand grains not exceeding 2 mm in size,
   a plurality of reversible water turbines operably associated with electrical motors/generators, the water turbines are configured to direct water between the interior of the water reservoir and the body of water outside thereof, the water turbines are further configured to operate in an energy generating mode or a water pumping mode, wherein
      the energy generating mode is aimed to produce electrical energy by electrical motors/generators when the water turbines are driven to rotate by water draining from the water reservoir to the body of water outside thereof, and
      the water pumping mode is aimed to pump water from the body of water into the interior of the water reservoir when the water turbines are driven by the electrical motors/generators associated therewith and energized by electrical energy supplied thereto, and
   a computerized controller connected to electrical motors/generators and to an electrical power grid and configured to cause:
      accumulating energy by filling the water reservoir with water using excess electrical energy from the electrical power grid to operate electrical motors/generators of the water turbines, or releasing energy by draining the water from the water reservoir to cause electrical motors/generators to generate electrical energy and supply thereof to the electrical power grid, thereby reducing fluctuations in peak electrical energy supply and peak electrical energy demand of the electrical power grid.

2. The water reservoir system as in claim 1, wherein each water turbine is equipped with one or more sluices configured to control water flow across thereof.

3. The water reservoir as in claim 1, wherein the abundant body or water is a lake, a sea, or an ocean.

4. The water reservoir as in claim 1, wherein the computerized controller is configured to initiate accumulating energy in the water pumping mode upon receiving a first signal from the electrical power grid or upon detection of electrical energy in the electrical power grid exceeding a predetermined peak supply threshold.

5. The water reservoir as in claim 1, wherein the computerized controller is further configured to initiate accumulating energy in the water pumping mode upon receiving the first signal from the electrical power grid or detection of electrical energy in the electrical power grid exceeding a predetermined peak supply threshold and the water level in the water reservoir is below the maximum water level.

6. The water reservoir as in claim 4, wherein the computerized controller is further configured to initiate releasing energy in the energy generating mode upon receiving a second signal from the electrical power grid or upon detection of electrical energy in the electrical power grid falling below a predetermined peak demand threshold, the predetermined peak demand threshold is lower than the predetermined peak supply threshold.

7. The water reservoir as in claim 6, wherein the computerized controller is configured to initiate releasing energy in the energy generating mode upon receiving the second signal from the electrical power grid or detection of electrical energy in the electrical power grid falling below a predetermined peak demand threshold and the water level in the water reservoir is above the current water level in the body of water outside the water reservoir.

8. The water reservoir as in claim 6, wherein the computerized controller is further configured to store water within the water reservoir for subsequent generating of electrical energy and without either immediate accumulating or immediate releasing energy when no first or second signal is received from the electrical power grid or upon the electrical power in the electrical power grid is determined by the computerized controller to be above the predetermined peak demand threshold and below the predetermined peak supply threshold.

9. The water reservoir as in claim 1 further comprising one or more solar panels electrically connected to electrical motors/generators of water turbines and to the computerized controller, the one or more solar panels are further configured to float on water within the water reservoir and generate supplemental electrical energy.

10. The water reservoir as in claim 9, wherein the electrical cables connecting the one or more floating solar panels to the electrical motors/generators and to the computerized controller are further configured to provide uninterrupted electrical connections for the one or more solar panels at various water levels in the water reservoir ranging from minimum water level to maximum water level, thereby providing uninterrupted electrical connections regardless of the water level within the water reservoir.

11. The water reservoir as in claim 9, wherein the computerized controller is further configured to direct the supplemental electrical energy generated by the one or more solar panels to energize electrical motors/generators and cause pumping of water into the water reservoir when accumulating energy or upon detection of electrical energy in the electrical power grid at or exceeding the predetermined peak demand threshold and upon detection of water level in the water reservoir below the maximum water level.

12. The water reservoir as in claim 9, wherein the computerized controller is further configured to direct the supplemental electrical energy generated by the one or more solar panels to supplement the electrical energy of the power grid upon detection of electrical energy in the electrical power grid below the predetermined peak supply threshold.

13. The water reservoir as in claim 1 further comprising at least one spillover openings configured to avoid exceeding the maximum water level by releasing excess water to the abundant body of water outside the water reservoir.

14. The water reservoir as in claim 1, further comprising a plurality of water pumps configured to pump water from the abundant body of water into the water reservoir.

15. The water reservoir as in claim 14, wherein the water pumps are axial flow rotary water pumps.

16. The water reservoir as in claim 14, wherein the water pumps are energized only by wind power, wherein water pumping into the water reservoir by the water pumps proceeds independently of the computerized controller causing the water turbines and associated electrical motors/generators to operate in the energy-generating mode or in the energy-releasing mode.

17. The water reservoir as in claim 16, wherein the water pumps are energized by one or more horizontal or vertical wind turbines.

18. The water reservoir as in claim 17, wherein each water pump is energized by a wind turbine operatively connected thereto by a gearbox.

19. The water reservoir as in claim 17, wherein each wind turbine is mounted on a tower located along and forming a part of the wall of the water reservoir.

20. The water reservoir as in claim 14, wherein each water pump is located in a water-filled water pathway between the abundant body of water and the interior of the water reservoir, each water pathway is further equipped with a one-way valve allowing water to only flow into the water reservoir and not out of the water reservoir.

21. The water reservoir system as in claim 1, wherein the computerized controller is equipped to monitor the water level in the water reservoir and the water level of the abundant body of water, wherein the computerized controller is further configured to allow water to passively flow from the abundant body of water into the water reservoir upon detecting the water level outside the water reservoir exceeding the water level inside thereof, thereby operating the water reservoir system as a tidal wave basin electrical generator.

22. A method of reducing peak electrical energy supply and peak electrical energy demand for an electrical power grid, the method comprising the following steps:

a. providing a water reservoir system comprising a water reservoir with an interior surrounded by a wall built in an abundant body of water from a bottom thereof and extending to a height above a water level of the body of water, wherein a bottom of the water reservoir remains open, the water reservoir has a diameter or width at or above 2 km, the water reservoir is located where the bottom of the abundant body of water contains a layer of sandy sediment with sand grains not exceeding 2 mm in size, the water reservoir system further comprising a plurality of reversible water turbines operably associated with electrical motors/generators, the water turbines are located under the water level of the abundant body of water and configured to direct water across the wall between the interior of the water reservoir and the body of water outside thereof, b. operating the water reservoir system to accumulate energy by filling the water reservoir with water from the abundant body of water using excess electrical energy during peak electrical energy supply of the electrical power grid to operate electrical motors/generators of the water turbines, or c. operating the water reservoir system to release electrical energy during peak energy demand of the electrical power grid by draining the water from the water reservoir to cause electrical motors/generators to generate electrical energy and supply thereof to the electrical power grid.

23. A water reservoir system for generating, accumulating, storing, and releasing electrical energy, the water reservoir system comprising:

a water reservoir in fluid flow communication with a body of water, the water reservoir comprising a wall extending to a height above a water level of the body of water, wherein a bottom of the water reservoir remains open, the water reservoir has a diameter or width at or above 2 km, the water reservoir is located where the bottom of the abundant body of water contains a layer of sandy sediment with sand grains not exceeding 2 mm in size, a plurality of water turbines operably associated with electrical motors/generators, the water turbines are configured to direct water between the interior of the water reservoir and the body of water outside thereof, at least one or both of the following:
    a plurality of wind-driven water pumps configured to pump water from the body of water into the water reservoir, and
    one or more solar panels configured to float on water within the water reservoir and generate supplemental electrical energy, a computerized controller connected to electrical motors/generators of the water turbines and to the electrical power grid and configured to cause:
    accumulating energy by filling the water reservoir with water using excess electrical energy from the electrical power grid to operate electrical motors/generators of the water turbines, or
    releasing energy by draining the water from the water reservoir to cause electrical motors/generators to generate electrical energy and supply thereof to the electrical power grid.

* * * * *